April 10, 1962 J. A. BALDWIN, JR 3,029,415

NONDESTRUCTIVE MEMORY CIRCUITS

Filed Aug. 8, 1958 2 Sheets-Sheet 1

INVENTOR
J. A. BALDWIN, JR

BY William H. Kamstra

ATTORNEY

INVENTOR
J. A. BALDWIN, JR
BY William H. Kamstra
ATTORNEY

United States Patent Office 3,029,415

Patented Apr. 10, 1962

3,029,415
NONDESTRUCTIVE MEMORY CIRCUITS

John A. Baldwin, Jr., Murray Hill, N.J., assignor to Bell Telephone Laboratories, Incorporated, New York, N.Y., a corporation of New York Filed Aug. 8, 1958, Ser. No. 754,018
6 Claims. (Cl. 340—174)

This invention relates to electrical circuits and more particularly to such circuits and methods employing magnetic cores as memory elements.

It is well known that magnetic cores with rectangular hysteresis loops can be used to store binary values by being magnetized in either of two remanent flux states. One binary value is associated with one of the remanent states and the other binary value with the other of the remanent states. Which of the binary values is stored in the core at any given time is determined by applying a read-out current pulse to a coil inductively coupled to the core. Should a reversal of the magnetic flux from one of its remanent states to the other remanent state occur as a result of the read-out current pulse, a voltage will be induced across a sensing coil also inductively coupled to the core, which voltage will be indicative of a particular binary value. Obviously this method of read out destroys the particular stored information value and, if more permanent storage is required, the information must be rewritten in the core.

One well-known means for insuring the retention of information in a core after read out provides for the immediate restoration of the information into the core following each read-out operation. Such a means, however, still requires that the magnetic flux in the core be completely switched from one state of remanent magnetization to the other during the read-out operation with attendant disadvantages in terms of time, power requirements, and additional circuitry required for the information restoration operation.

Accordingly, an object of this invention is to determine the character of an information bit stored in a magnetic core without destroying that information during the read-out process.

Another object of this invention is to store a binary information bit by means of a new and novel memory cell.

The foregoing and other objects are realized according to the principles of this invention in one illustrative embodiment thereof comprising a magnetic core, which may be of the conventional square-loop, toroidal type, in which a state of remanent magnetization of one absolute value is selected to represent one binary value and a state of remanent magnetization of a different absolute value is selected to represent the other binary value. The remanent points selected will thus lie on different hysteresis characteristic loops of the core material. According to this embodiment, the character of a particular binary value stored in the core may be determined by applying radio frequency current to a read-out coil inductively coupled to the core. Corresponding excursions of flux are caused about these points without changing the remanent point of the flux. Because of the difference in the magnetic permeability of the core when magnetized to remanent states of different absolute values, voltages are induced in a sensing coil also coupled to the core which correspond to the radio frequency flux excursions and which will differ in amplitude depending upon the particular binary value stored. By means of suitable output circuitry, this difference in voltage amplitudes is advantageously compared to manifest the particular binary value contained in the core.

According to a second embodiment of this invention, a second core is added to make up a two-core storage cell in which a particular binary value is stored by setting one of the cores in a state of remanent magnetization of a first absolute value and by setting the other core in a state of remanent magnetization of a different absolute value. By applying a radio frequency read-out current to read-out windings of each of the cores, flux excursions will occur and voltages will, as a result, be induced in sensing coils inductively coupled to the cores. The sensing coils are connected in an output circuit in series opposing and, because of the difference in the magnetic permeability of the cores due to the respective remanent magnetizations at different absolute values, voltages of differing amplitudes as well as opposing phase will be induced in the two sensing coils. Accordingly, a resultant output voltage appears in the output circuit, the phase of which is determined by whichever core was at a remanent point of lesser absolute value. This follows from the inverse relationship which exists between permeability and absolute remanent magnetic value. The phase of the resultant voltage thus is indicative of the particular binary value contained in a core-pair cell.

Accordingly, one feature of this invention is a magnetic core arrangement in which the difference in magnetic permeability at remanent points of different absolute values of magnetization is applied to produce distinctive output signals manifesting the binary values.

Another feature of this invention is a means for causing flux excursions in a magnetic core about remanent points on different hysteresis loops representative of binary values to produce distinctive output signals without driving the core permanently from the remanent points for nondestructive read out.

Still another feature of this invention is a read out which compares the phase relationship of output signals generated by flux excursions in a pair of cores each of which is in a remanent state on a different hysteresis loop to manifest a particular binary value stored in the core pair as such remanent states.

A complete understanding of this invention and of the above and other objects and features thereof may be gained from a consideration of the following detailed description together with the accompanying drawing, in which.

Figure 1:
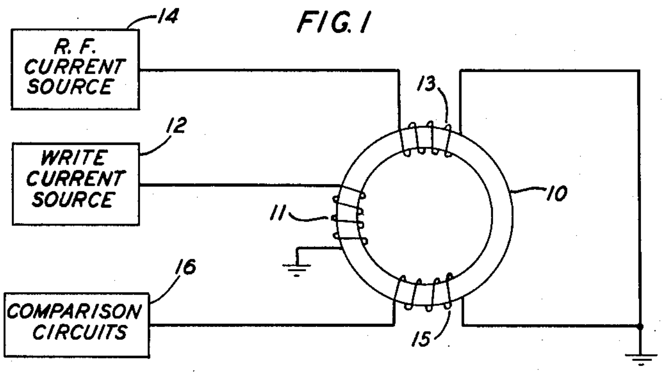
FIG. 1 depicts one specific illustrative embodiment of this invention comprising a magnetic memory core with nondestructive read out.

In FIG. 1 is shown one memory circuit illustrating the principles of this invention and with which the method of this invention may be practiced. The circuit includes as a memory element a magnetic core 10 which may be of the conventional toroidal type displaying substantially rectangular hysteresis characteristics. The core 10 has a setting coil 11 inductively coupled thereto which coil 11 is connected between ground and a write current pulse source 12, a read-out coil 13 inductively coupled thereto connected between ground and a radio frequency current source 14, and a sensing coil 15 inductively coupled thereto connected between ground and a suitable comparison circuit 16.

The current pulse source 12 may conveniently comprise any suitable pulse circuit known in the art capable of generating current pulses of either of two magnitudes or, alternatively, of different time duration, to be more specifically described hereinafter, as controlled by the particular binary value to be stored in the core. When current pulses of differing time duration are employed to effect the writing function, the source 12 may conveniently comprise a source such as that described in the copending application of F. E. Froehlich, Serial No. 626,772, filed December 6, 1956. The source 14 may comprise any suitable source of radio frequency current pulses. The comparison circuit 16 may comprise any suitable circuit known in the art capable of distinguishing output signals of different amplitudes such as, for example, a threshold circuit which only passes signals above a particular amplitude. Since circuits 12, 14, and 16 are known to one skilled in the art, they are considered herein only in block diagram form.

Figure 2:
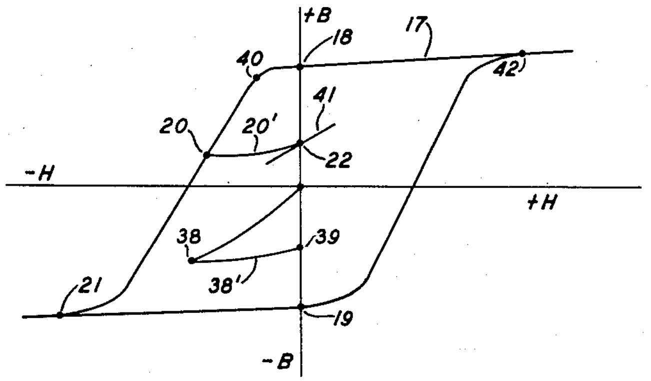
FIG. 2 depicts an idealized hysteresis loop showing flux excursions of the magnetic cores of the embodiments of FIGS. 1 and 3 during various operative stages of this invention.

One binary value may be introduced in the core 10 by driving the core to either point of magnetic remanence on its major hysteresis loop. The idealized hysteresis loop 17 of FIG. 2 on which these points are designated by points 18 and 19 may be referred to at this point and in connection with further description of the operation of this invention. Either of these states may be assumed by the core 10 by applying a current pulse of proper polarity from the source 12 through coil 11 which current pulse is sufficient to drive the core to the selected remanent state. For purposes of description the remanent point selected may be assumed to be the point 18 on the major loop 17 shown in FIG. 2. The other binary value is read into the core 10 by driving it to a point of magnetic remanence of a different value of absolute magnetization on one of the minor hysteresis loops of the core 10 material. Thus, another current pulse of suitable magnitude and polarity is applied by the source 12 to cause the required flux shift. In the present embodiment, as depicted in FIG. 2, this flux shift is from the remanent point 18 on the major loop 17, beyond the point 40 of the knee of the loop, to the point 20 on the major loop 17. The point 20 may be any point of magnetization, including that of zero magnetization, lying between the knee point 40 and the point of opposite saturation 21. Upon the interruption of the driving magnetomotive force, the flux in the core 10, not being at a point of remanence at point 20, will return via a minor hysteresis loop, a portion 20' of which is shown in FIG. 2, to a point of remanent magnetization 22 on the minor loop. The point 22 representing the other binary value obviously represents a magnetization of an absolute value different from and, in this case, less than that represented at the point 18 which represents the first binary value.

The flux shift to the point 22 could also be accomplished by the application of a current pulse from source 12 of a suitable time duration and polarity as well as by the application of a current pulse of a suitable magnitude and polarity. Thus a pulse of a magnitude sufficient to drive the core from point 18 to the point of opposite saturation 21 can be used to drive the core to the point 22 if the end of the pulse occurs sometime before the flux has reached the point 21. The latter method may advantageously be used in conjunction with cores, for example, having hysteresis loops with very nearly vertical sides.

Figures 4, 5:
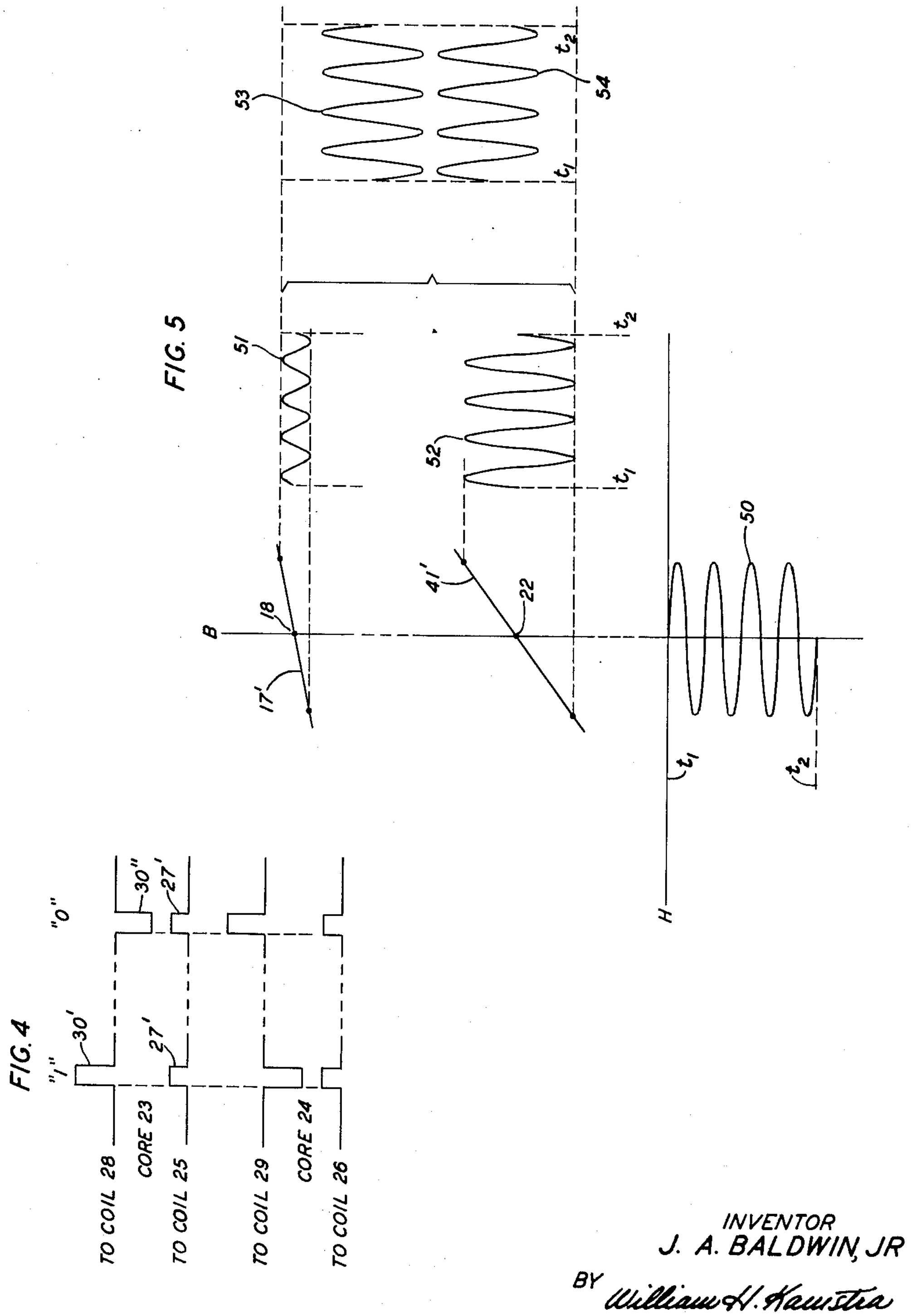
FIG. 4 is a pulse chart illustrating the relative magnitudes and polarities of setting current pulses employed in connection with the embodiment of FIG. 3.
FIG. 5 is a chart showing a projection on portions of the hysteresis loops of FIG. 2 of read-out current pulses and resulting output voltages generated also in connection with the embodiments of FIGS. 1 and 3.

Since the permeability of the magnetic core at any point of magnetic remanence is inversely related to the absolute value of the remanent magnetization, the permeability is greater at the point 22 than at the point 18. Based on this permeability differential, output voltages of different amplitudes will be induced in a sensing coil 15 due to flux excursions at the point 18 and the point 22. Accordingly, read out is accomplished by sending a pulse of radio frequency current from the source 14 through the coil 13 to cause corresponding flux excursions in the core 10 at the remanent points 18 or 22 depending upon the particular binary value stored. The flux excursions about point 18 will be along the almost horizontal upper portion of the major hysteresis loop 17 while the flux excursions about point 22 will be along a line having a larger angle with the H axis, such as the line 41 of FIG. 2. By properly selecting the amplitude and frequency of the radio frequency read-out current, the core 10 will remain in the same state of remanent magnetization following the application of the radio frequency current as it was prior to the application of the read-out current. Due to the difference in permeabilities, the voltage induced in the sensing coil 15 will be of a substantially greater amplitude when the core is at the remanent point 22 than when it is at the remanent point 18. This difference in induced voltage is shown in FIG. 5. Comparison of the induced output voltage signals, by the comparison circuits 16, corresponding to the two points of remanent magnetization 18 and 22 may be accomplished to determine the binary value stored in the core 10 at the time interrogated. Obviously, the voltage induced in coil 15 will be a maximum when point 22 is at the point of zero magnetization of the hysteresis loop. However, it is to be understood that this invention is not limited to operation at the point 18 and the point of zero magnetization but rather may be operated at any points of different absolute values of magnetization including that of point 18 and zero magnetization.

Figure 3:
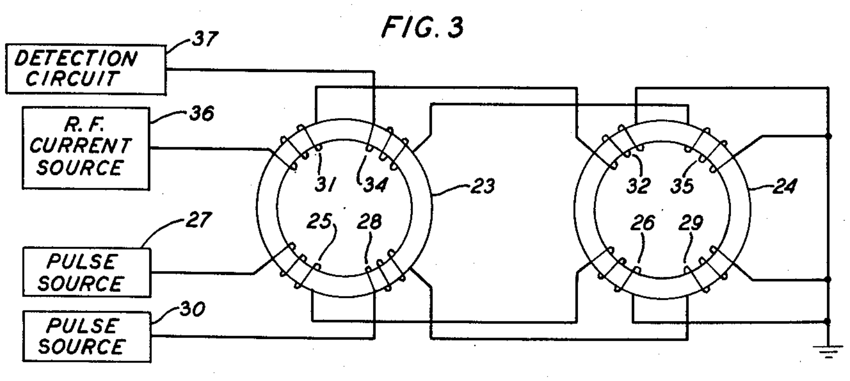
FIG. 3 depicts another illustrative magnetic memory arrangement according to the principles of this invention.

In FIG. 3 is shown a two-core embodiment of this invention which comprises magnetic cores 23 and 24, each of which may also be of the well-known square-loop toroidal type. The cores 23 and 24 each has inductively coupled thereto a pair of setting coils 25 and 28, and 26 and 29, respectively. The coils 25 and 26 are connected in series aiding between ground and a current pulse source 27. The coils 28 and 29, on the other hand, are connected in series opposing between ground and another current pulse source 30. In addition the cores 23 and 24 have inductively coupled thereto read-out coils 31 and 32, and sensing coils 34 and 35, respectively. The coils 31 and 32 are connected in series aiding between ground and a radio frequency current source 36, and the coils 34 and 35 are connected in series opposing between ground and a detection circuit 37. Current pulse sources 27 and 30 may conveniently comprise any suitable circuits known in the art capable of providing current pulses of the magnitude and polarity or duration and polarity to be more specifically described hereinafter. The source 36 provides pulses of radio frequency current and the detection circuit 37 may comprise any suitable circuit capable of determining the relative phase difference between a number of output signals. Since circuits 27, 30, 36, and 37 are known to one skilled in the art, they are considered herein in block diagram form only.

For purposes of describing the operation of the embodiment of FIG. 3, reference may again be had to the representation of flux excursions of FIG. 2, and also to the pulse charts of FIGS. 4 and 5.

Initially, the cores 23 and 24 may be assumed to be in an unmagnetized state. The binary values are established in the two-core cell by applying simultaneous current pulses of particular polarities and magnitudes from the sources 27 and 30 to the setting coils 25 and 26, and the setting coils 28 and 29, respectively. The coils 25 and 28 are coupled to the core 23 in the same sense such that current pulses of the same sign from the sources 27 and 30, respectively, will aid each other in effecting flux changes in the core 23. Since the coils 26 and 29 are coupled to the core 24 in the opposite sense, current pulses of the same sign will oppose each other in causing flux changes in core 24. Conversely, current pulses of opposite sign from the sources 27 and 30, respectively, will oppose each other with respect to flux changes in the core 23 but will aid each other with respect to flux changes in the core 24. With both cores initially in an unmagnetized state, one binary value, say a binary "1," may be established in the two-core cell by applying simultaneous positive current pulses, such as the pulses 27′ and 30′ depicted in FIG. 4, to the respective associated setting coils from the sources 27 and 30, the pulse 30′ from source 30 being of a greater magnitude than the pulse 27′ from the source 27. The addition of these pulses with respect to the core 23 will produce a magnetomotive force of a magnitude such that the flux in that core will be driven to saturation in one direction, that is, past the point 42 on the major hysteresis loop 17. Because of the partial cancellation of the pulses 30′ and 27′ due to the opposition of the coils 29 and 26 of the core 24, the flux in that core will be shifted only to, say, the point 38, on a minor hysteresis loop, a portion 38′ of which is shown in FIG. 2. As a result of the foregoing setting operation, upon removal of the driving magnetomotive forces, core 23 will be left at the point 18, a point of remanent magnetization on the major hysteresis loop 17, and core 24 will be left at the point 39, a point of remanent magnetization on a minor hysteresis loop.

As explained in connection with the embodiment of FIG. 1, the cores could also be driven to points 18 and 39 by the application of current pulses from sources 27 and 30 of suitable time duration and polarity as well as of suitable magnitude and polarity.

A binary "0" is established in the two-core cell by simultaneously applying another positive current pulse 27′ from source 27 and a negative current pulse 30″ from source 30, which latter pulse, although of opposite polarity is again of a larger absolute magnitude than the pulse 27′ applied to the setting coils 25 and 26, and to the coils 28 and 29, respectively. The coils 25 and 28 are in the same sense and the resultant of the oppositely poled setting currents will shift the flux of core 23 from the point 18 to the point 20 on the major hysteresis loop 17 of FIG. 2. Since the coils 26 and 29 are in opposite senses, the oppositely poled setting currents will aid each other with respect to flux excursions in the core 24 and this time the flux in the latter core will be driven to saturation in one direction, that is, past the point 42 on the major hysteresis loop 17. The effective current pulses as applied to the cores 23 and 24 are also shown in FIG. 4. As a result of the latter setting operation, upon removal of the driving magnetomotive forces, core 24 will this time be left at the point 18, a point of remanent magnetization on the major hysteresis loop 17, and core 23 will be at the point 22, a point of remanent magnetization on a minor hysteresis loop. In this case also, the cores could be driven to points 18 and 22 by the application of current pulses from sources 27 and 30 of suitable time duration and polarity rather than magnitude and polarity. When a binary "1" is again established in the two-core cell by the application of simultaneous positive current pulses from sources 27 and 30, as previously described, core 23 will be set to the point 18 and core 24 to the point 22. One core will be at the point 39 after the establishment of a binary value in the cores only when the cores were both in a non-magnetized state prior to the introduction of this binary value, and at all other times a binary value will be represented by one core being at point 18 and the other core being at point 22.

Sensing is accomplished by sending a radio frequency current pulse, such as the pulse 50 shown in FIG. 5, from the source 36 through the serially-connected coils 31 and 32 of the cores 23 and 24, respectively, to cause corresponding flux excursions in the latter cores about their respective remanent points. Assuming a binary "1" is stored in the two-core cell as previously explained, the core 23 will accordingly be in a remanent state designated by the point 18 and the core 24 will accordingly be at the point 22, or at the point 39 if core 24 were nonmagnetized prior to the establishment of this binary "1." As a result of the radio frequency flux excursions about the point 22 or 39 in the core 24 and the point 18 in the core 23, voltages will be induced in the serially-connected sensing coils 34 and 35. As previously explained in connection with the embodiment of FIG. 1, the permeability of the core 24 at this time will be greater than that of the core 23 and, as a result, a larger voltage will be induced in the sensing coil 35 than in the sensing coil 34. In addition, the sensing coils 34 and 35 are coupled to cores 23 and 24 in opposite senses such that the voltages induced across the later coils by the application of the radio frequency current to the read-out coils 31 and 32 will be of opposite phase. The resultant output voltage signal will accordingly be in a phase directly representative of the binary value contained in the storage cell, that is, in accordance with the relative magnitudes of the oppositely phased output voltages generated, radio frequency output voltages 180° out of phase will be represenative of the two binary values which may be stored in the two-core cell. This difference in phase will be detected by the detection circuit 37 in a manner well known in the art.

In FIG. 5 is shown a comparison of the relative amplitudes of the radio frequency read-out current pulse 50 and the radio frequency voltages 51 and 52 generated as a result of the radio frequency flux excursions during the period $t_1$ to $t_2$ in the cores at the remanent points 18 and 22, respectively. The output voltages 51 and 52 are projected from the read-out current 50 along portions of the flux excursion loci 17 and 41 of the loops of FIG. 2, the slopes of the line segments 17′ and 41′ representing the relative permeabilities of the cores 23 and 24 at the remanent points 18 and 22, respectively. For purposes of description all phase shifts other than those relevant to the operation of this invention have been neglected. The voltages 51 and 52 are shown as being in phase, however, since the coils 34 and 35 on which they appear are connected in opposite sense, the phase of the resultant output voltage will be controlled by whichever coil 34 or 35 had the greater voltage generated therein. The latter is obviously determined by whichever core is at the point of greater permeability as is shown in FIG. 5. The output signal 53 designated as represenative of a binary "1," will accordingly always be 180° out of phase with the output signal 54 designated as representative of a binary "0."

What has been described is the nondestructive read out of a binary "1"; nondestructive read out of a binary "0" can also be obtained in a similar manner. In that case the core 23 will have a greater permeability than the core 24 and a larger voltage will be induced in coil 34 than in coil 35. The output voltage signal supplied to the detection circuits 37 will be in a phase 180° removed from the signal representing the binary "1." In the foregoing read-out operation it is obvious that neither core is permanently driven from its point of remanent magnetization and nondestructive read out in a literal sense is accomplished.

Although in the illustrative embodiments described hereinbefore read out was accomplished by means of the application of radio frequency currents, single pulses of very short duration and suitable amplitude could also have been used. In addition, it is to be understood that the principles of this invention may equally well be practiced in conjunction with magnetic structures having geometries other than the conventional toroidal form described herein. Thus, for example, the ferrite bead structure described in the copending application of D. H. Looney and R. H. Meinken, Serial No. 554,841, filed December 22, 1955, now Patent No. 2,981,932, issued April 25, 1961, or the ferrite solid structure described in the copending application of A. H. Bobeck, Serial No. 710,565, filed January 22, 1958, now Patent No. 2,985,768, issued May 23, 1961, may also be used as the memory elements with which the nondestructive read-out methods of this invention may be practiced.

What have been described are considered to be only illustrative embodiments according to the principles of the present invention and it is to be understood that numerous other arrangements may be devised by one skilled in the art without departing from the spirit and scope thereof.

What is claimed is:

1. An information storage circuit comprising a first and second magnetic core each having substantially rectangular hysteresis characteristics, write means for placing said first core at a first point of remanent magnetization of one absolute value and for placing said second core at a second point of remanent magnetization of a different absolute value to represent particular binary information, said write means including a first pair of windings coupled respectively to said first and second core connected in series aiding and a second pair of windings coupled respectively to said first and second core connected in series opposing, read-out means for causing flux excursions in each of said cores about said respective points without substantially changing the remanent magnetization, sensing coils inductively coupled to each of said cores energized responsive to said flux excursions for generating a first and a second output signal, and means for combining said first and second output signals to produce a resultant signal indicative of said particular binary information.

2. An information storage circuit comprising a first and second magnetic core each having substantially rectangular hysteresis characteristics, write means for placing said first core at a first point of remanent magnetization of one absolute value and for placing said second core at a second point of remanent magnetization of a different absolute value to represent particular binary information, said write means including a first pair of windings coupled respectively to said first and second core connected in series aiding and a second pair of windings coupled respectively to said first and second core connected in series opposing, means including read-out coils inductively coupled to each of said cores and a radio frequency current source for causing radio frequency flux excursions in each of said cores about said respective points, a sensing coil inductively coupled respectively to each of said cores, said sensing coils being connected in series in a sense such that an output signal generated in one responsive to said flux excursions is of opposite phase to an output signal generated in the other responsive to said flux excursions, and means for combining output signals in said sensing coils to produce a resultant signal indicative of said particular binary information.

3. A memory circuit comprising a first and a second magnetic core each having substantially rectangular hysteresis characteristics, a pair of setting windings for each of said cores, first setting windings of said cores being serially connected in the same sense and the other setting windings of said cores being serially connected in the opposite sense, and means including pulse sources including one bipolar pulse source for simultaneously applying a pulse of one magnitude and polarity to said first setting windings and a pulse of a greater magnitude and the same polarity to said other setting windings to set one core to a remanent magnetization of one absolute value and the other core to a remanent magnetization of a different absolute value representative of one binary value and for simultaneously applying a pulse of one magnitude and polarity to said first setting windings and a pulse of a greater magnitude and the opposite polarity to said other setting windings to reverse the absolute values of remanent magnetization of the respective cores representative of the other binary value.

4. A memory circuit as claimed in claim 3 also comprising a read-out winding and a sensing winding for each of said cores, said read-out windings being serially connected in the same sense and said sensing windings being serially connected in the opposite sense, means including a current pulse source for applying pulses of radio frequency current to said read-out windings to cause radio frequency flux excursions in said cores, and means for comparing the phase of output voltages induced in said sensing windings.

5. A memory circuit comprising a first and a second magnetic core each having substantially rectangular hysteresis characteristics, a pair of setting windings for each of said cores, first of said setting windings of each of said cores being serially connected in the same sense and the other of said setting windings of each of said cores being serially connected in the opposite sense, and means including pulse sources including one bipolar pulse source for simultaneously applying a pulse of one polarity and time duration to one of said serially connected pairs of setting windings and a pulse of the same polarity and a longer time duration to the other of said serially connected pairs of setting windings to set one core to a remanent magnetization of one absolute value and the other core to a remanent magnetization of a different absolute value representative of one binary value and for simultaneously applying a pulse of one polarity and time duration to said first setting windings and a pulse of the opposite polarity and a longer time duration to said other setting windings to substantially reverse the absolute values of remanent magnetization of the respective cores representative of the other binary value.

6. A memory circuit as claimed in claim 5 also comprising a read-out winding and a sensing winding for each of said cores, said read-out windings being serially connected in one sense and said sensing windings being serially connected in the other sense, means including a current pulse source for applying pulses of radio frequency current to said read-out windings to cause radio frequency flux excursions in said cores, and means for comparing the phase of output voltages induced in said sensing windings.

References Cited in the file of this patent

UNITED STATES PATENTS

| | | |
|---|---|---|
| 2,574,438 | Rossie et al. | Nov. 6, 1951 |
| 2,801,344 | Lubkin | July 30, 1957 |
| 2,832,945 | Christensen | Apr. 29, 1958 |

OTHER REFERENCES

"A Radio-Frequency Nondestructive Readout For Magnetic-Core Memories," by Bernard Widrow, published in "IRE Transactions," vol. EC–3, Issue 4, December 1954, pp. 12–15, FIG. 5 relied on.